(12) United States Patent
Yavo et al.

(10) Patent No.: US 11,856,008 B2
(45) Date of Patent: Dec. 26, 2023

(54) FACILITATING IDENTIFICATION OF COMPROMISED DEVICES BY NETWORK ACCESS CONTROL (NAC) OR UNIFIED THREAT MANAGEMENT (UTM) SECURITY SERVICES BY LEVERAGING CONTEXT FROM AN ENDPOINT DETECTION AND RESPONSE (EDR) AGENT

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 401 days.

(21) Appl. No.: 17/139,896

(22) Filed: Dec. 31, 2020

(65) Prior Publication Data
US 2022/0210168 A1 Jun. 30, 2022

(51) Int. Cl.
*H04L 9/40* (2022.01)

(52) U.S. Cl.
CPC ........ *H04L 63/1416* (2013.01); *H04L 63/105* (2013.01); *H04L 63/1433* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 2021/0117251 A1* | 4/2021 | Cristofi | G06F 9/542 |
| 2021/0176261 A1* | 6/2021 | Yavo | H04L 63/1433 |
| 2021/0185057 A1* | 6/2021 | McLean | H04L 63/1416 |
| 2021/0297427 A1* | 9/2021 | Narula | G06F 3/048 |
| 2021/0306352 A1* | 9/2021 | Narula | H04L 63/1425 |
| 2022/0070182 A1* | 3/2022 | Bowditch | H04L 63/1425 |

* cited by examiner

*Primary Examiner* — Joseph P Hirl
*Assistant Examiner* — Hassan Saadoun
(74) *Attorney, Agent, or Firm* — Jaffery Watson Mendonsa & Hamilton LLP (57) ABSTRACT

Systems and methods are provided for synergistically combining network security technologies to detect compromised devices. According to one embodiment, an endpoint detection and response (EDR) agent of multiple endpoint security agents running on an endpoint device detects an incident. A security incident alert is generated by the EDR agent by proactively collecting data regarding the incident. Identification of a device coupled to a private network as potentially being compromised by a security service of a Managed Security Service Provider (MSSP) protecting the private network is facilitated by the EDR agent transmitting the security incident alert to the security service via a security agent of the multiple endpoint security agents corresponding to the security service.

24 Claims, 9 Drawing Sheets

FACILITATING IDENTIFICATION OF COMPROMISED DEVICES BY NETWORK ACCESS CONTROL (NAC) OR UNIFIED THREAT MANAGEMENT (UTM) SECURITY SERVICES BY LEVERAGING CONTEXT FROM AN ENDPOINT DETECTION AND RESPONSE (EDR) AGENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

Field

Embodiments of the present disclosure generally relate to the field of network security. In particular, embodiments of the present disclosure relate to synergistic cooperation/communication among multiple network security agents for efficient detection of compromised devices.

BACKGROUND

Description of the Related Art

Existing network security technologies, such as Network Access Control (NAC), endpoint detection and response (EDR), event management, and analytics tools, work well in their respective individual capacities, and each has its own set of capabilities, with some overlap. NAC provides the network visibility to see everything connected to the network, as well as the ability to control those devices and users, including dynamic, automated responses. EDR facilitates the detection of attacks on endpoints and orchestration of appropriate responses. Event management systems (e.g., security information and event management (SIEM) security products) are capable of receiving alerts and/or generating alerts based on data collected collects from various security controls. Analytics tools (e.g., user entity behavior analytics (UEBA)) assist in connection with protecting enterprises from insider threats by monitoring users and endpoints and identifying potential anomalous behavior. At present, however, these network security technologies operate in silos and do not share information with each other that might be mutually beneficial.

SUMMARY

Systems and methods for synergistically combining network security technologies to detect compromised devices are described. According to one embodiment, an endpoint detection and response (EDR) agent of multiple endpoint security agents running on an endpoint device detects an incident. A security incident alert is generated by the EDR agent by proactively collecting data regarding the incident. Identification of a device coupled to a private network as potentially being compromised by a security service of a Managed Security Service Provider (MSSP) protecting the private network is facilitated by the EDR agent transmitting the security incident alert to the security service via a security agent of the multiple endpoint security agents corresponding to the security service.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for synergistically combining network security technologies to identify compromised devices. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "data feed" generally refers to a security event classification source or a threat intelligence sources. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning malware classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, network security devices and the like.

The phrase "endpoint protection platform" generally refers to cybersecurity monitoring and/or protection functionality implemented on an endpoint device. In one embodiment, the endpoint protection platform can be deployed in the cloud or on-premises and supports multitenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the FORTIEDR Software as a Service (SaaS) platform and the FORTICLIENT integrated endpoint protection platform available from Fortinet, Inc. of Sunnyvale, CA.

As used herein an "incident" generally refers to any malicious act or suspicious event observed within a private network. Such malicious acts typically (i) compromise or represent an attempt to compromise the logical border surrounding a network to which assets (e.g., programmable electronic devices and communication networks including hardware, software, and data) are connected and for which access is controlled or (ii) disrupt or represent an attempt to disrupt such assets. Non-limiting examples of types or classes of incidents include unauthorized attempts to access systems or data, privilege escalation attacks, unusual behavior from privileged user accounts, insider threats (e.g., insiders trying to access servers and data that isn't related to their jobs, logging in at abnormal times from unusual locations, or logging in from multiple locations in a short time frame), anomalies in outbound network traffic (e.g., uploading large files to personal cloud applications, downloading large files to external storage devices, or sending large numbers of email messages with attachments outside the company), traffic sent to or received from unknown locations, excessive consumption of resources (e.g., processing, memory and/or storage resources), changes in configuration (e.g., reconfiguration of services, installation of startup programs, the addition of scheduled tasks, changes to security rules or firewall changes), hidden files (may be considered suspicious due to their file names, sizes or locations and may be indicative that data or logs may have been leaked), unexpected changes (e.g., user account lockouts, password changes, or sudden changes in group memberships), abnormal browsing behavior (e.g., unexpected redirects, changes in browser configuration, or repeated pop-ups), suspicious registry entries, phishing attacks, malware attacks, denial-of-service (DoS) attacks, man-in-the-middle attacks, and password attacks.

In the context of an endpoint device, the term "event" generally refers to an action or behavior of a process running on the endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a keylogging), an attempt capture a screen shot, an attempt to record sounds, and/or other behaviors or actions that may be similar to processes or programs known to be malicious. In one embodiment, events may be detected or intercepted by the endpoint protection platform, hooking filesystem and/or operating system application programming interface (API) calls of interest and/or by leveraging a hypervisor to monitor the operating system.

As used herein, "indicators of compromise" or simply "indicators" generally refer to pieces of forensic data that identify potentially malicious activity on a system or network. Non-limiting examples of such data include data found in system log entries or files. Indicators of compromise may aid information security and IT professionals in detecting data breaches, malware infections, or other threat activity. By monitoring for indicators of compromise, organizations can detect attacks and act quickly to prevent breaches from occurring or limit damages by stopping attacks in earlier stages. Non-limiting examples of indicators of compromise include unusual outbound network traffic, anomalies in privileged user account activity, geographical irregularities, log-in red flags, increases in database read volume, Hypertext Markup Language (HTML) response sizes, large numbers of requests for the same file, mismatched port-application traffic, suspicious registry or system file changes, unusual DNS requests, unexpected patching of systems, mobile device profile changes, bundles of data in the wrong place, web traffic with unhuman behavior, and signs of distributed DoS (DDoS) activity.

As used herein, a "network security appliance" or a "network security device" generally refers to a device or appliance in virtual or physical form that is operable to perform one or more security functions. A network security device may reside within the particular network that it is protecting or network security may be provided as a service with the network security device residing in the cloud. Some network security devices may be implemented as general-purpose computers or servers with appropriate software operable to perform the one or more security functions. Other network security devices may also include custom hardware (e.g., one or more custom Application-Specific Integrated Circuits (ASICs)). For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, a "super agent" generally refers to a set of cooperating security agents running on an endpoint device that is associated with respective security services. The agents may be operable to one or more of (i) communicate with their respective security services, (ii) locally apply policies configured by their respective security services, (iii) take action on network traffic, and (iv) collect and/or supply data regarding incidents, events and/or indicators. Non-limiting examples of agents that may be part of a super agent include a UEBA agent, an EM agent, an EDR agent, a network access control (NAC) agent, and a unified threat management (UTM) agent. According to various embodiments, the agents of the super agent may work synergistically with one or more of the other agents of the super agent and/or one or more other elements/components (e.g., security services and/or security functions provided by network security appliances) of a security fabric into which the elements/components are integrated, thereby enhancing network visibility and threat detection and providing a means for synchronizing a coordinated response. Non-limiting integration mechanisms by which the various agents and elements/components may communicate includes Syslog messages and Representational State Transfer (REST) APIs. For example, based on configured settings, the EDR agent may be operable to send information regarding EDR security events to a configured destination server in the form of Syslog messages. Alternatively, agents may be able to request information from, send information to, and/or request action to be taken by another agent or element/component via a rich set of APIs. In one embodiment, as more components/agents are installed as part of a super agent, more capabilities may be unlocked. For example, some capabilities are only available when a number of agents/components are installed. Depending upon the particular implementation, the super agent may use a unified installer that can install any combination of the agents and configure them. The different agents/components are aware of another and can communicate with one another, for example, via an inter-process communication mechanism (e.g., pipes).

Figure 1A:
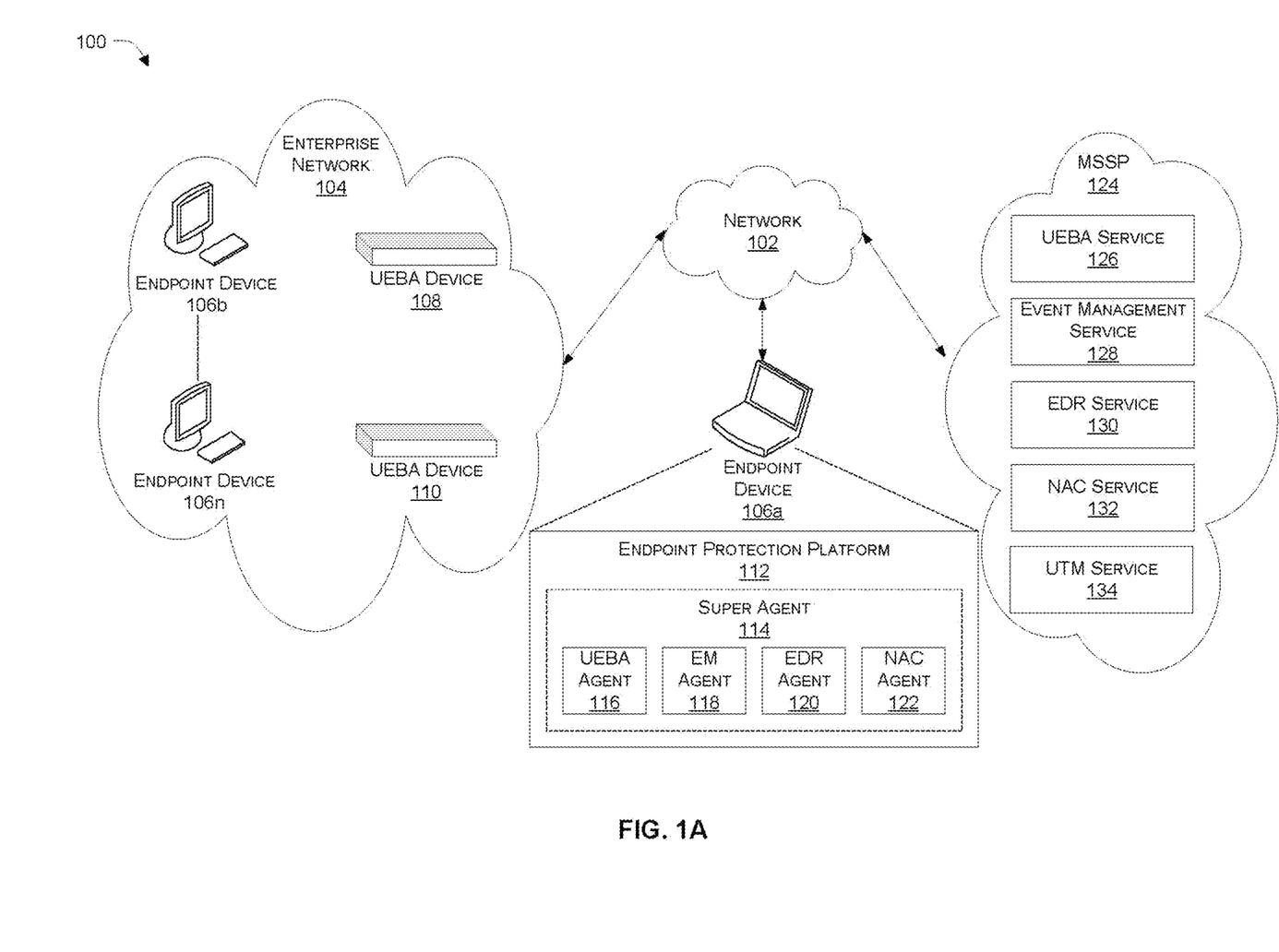
FIGS. 1A-B illustrate exemplary network architectures in accordance with an embodiment of the present disclosure.

FIG. 1A illustrates exemplary network architecture 100 in accordance with an embodiment of the present disclosure. In the context of network architecture 100, a super agent 114 is present within an endpoint protection platform 112 of an endpoint device 106-a, which is connected to an enterprise network 104 via a network 102. Super agent 114 includes a user and entity behavior analytics (UEBA) agent 116, an events management (EM) agent 118, an endpoint detection and response (EDR) agent 120, and a network access control (NAC) agent 122. UEBA agent 116, EM agent 118, EDR agent 120, and NAC agent 122 may be communicatively coupled with corresponding security services that are implemented on-premises (e.g., in the enterprise network 104) and/or in the cloud using a cloud-based security platform (e.g., managed security service provider (MSSP) 124). Each of the agents is aware of one another and may communicate with one another, for example, via an inter-process communication mechanism (e.g., a Linux or Unix pipe) supported by the operating system. In this manner, the various security services may make use of information available via one or more of the other security services by interacting via their respective agents.

In the context of the present example, enterprise network 104 includes endpoint devices 106b and 106n and a number of network security devices (e.g., a UEBA device 108 and an event management device 110) for protecting the enterprise network 104 and endpoint devices 106a-n. Endpoint devices 106a-n associated with the enterprise network 104 may be coupled in communication via network 102 with MSSP 124. The endpoint devices 106a-n (which may be collectively referred to herein as endpoint devices 106, and which may be individually referred to herein as endpoint device 106) associated with network 102 may include but are not limited to, personal computers, smart devices, web-enabled devices, hand-held devices, laptops, mobile devices, Internet of Things (IoT) devices, and the like. Those skilled in the art will appreciate network 102 may be a wireless network, a wired network, or a combination thereof and may be implemented as one of the various types of networks, such as an Intranet, a Local Area Network (LAN), a Wide Area Network (WAN), an Internet, and the like. Further, network 102 may either be a dedicated network or a shared network. A shared network may represent an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, super agent 114 is operable within the endpoint protection platform 112 of endpoint device 106a of the enterprise network 104. Super agent 114 includes multiple cooperating network security agents. The network security agents include a UEBA agent 116, an EM agent 118, an EDR agent 120, and a NAC agent 122. As noted above, a security service corresponding to each of the multiple network security agents may be implemented on-premises and/or within a cloud-based security platform (e.g., MSSP 124) to which the enterprise subscribes. While not specifically illustrated in the context of the present example, those skilled in the art will appreciate the endpoint protection platform 112, and associated super agent 114 may also be running on each of endpoint devices 106b-n.

While in the context of the present example, some security services are shown implemented both on-premises and in the cloud (e.g., by MSSP 124), those skilled in the art will appreciate such security services need not be duplicated, but rather, depending upon the particular implementation may be implemented on-premises by physical or virtual network security devices deployed within the enterprise network 104 and other security services may be implemented in the cloud, for example, by MSSP 124. For example, in one embodiment, a UEBA service and a STEM service may be implemented on-premises by UEBA device 108 and event management device 110, respectively, while the EDR service 130 is implemented in the cloud. Those skilled in the art will appreciate depending upon the particular implementation, some subset of security services corresponding to the agents 116, 118, 120, and 122 implemented within the endpoint protection platform 112 may be implemented on-premises (e.g., by physical or virtual network security devices deployed within the enterprise network 104) or in the cloud, for example, by MSSP 124. As such, in the context of the present example, MSSP 124 is shown including a UEBA service 126, an event management service 128, an EDR service 130, a NAC service 132, and UTM service 134 that may be used instead of or in addition to security services implemented on-premises for providing protection against threats and attacks on the enterprise network 104 and the endpoint devices 106a-n and detection of the compromised device(s).

Various non-limiting example scenarios in which the agents 116, 118, 120, and 122 may communicate with each other to synergistically combine information available via a variety of security services (e.g., UEBA device 108, event management device 110, UEBA service 126, event management service 128, EDR service 130, NAC service 132, and UTM service 134) to facilitate detection of compromised devices are described below with reference to FIGS. 4-7.

Figure 1B:
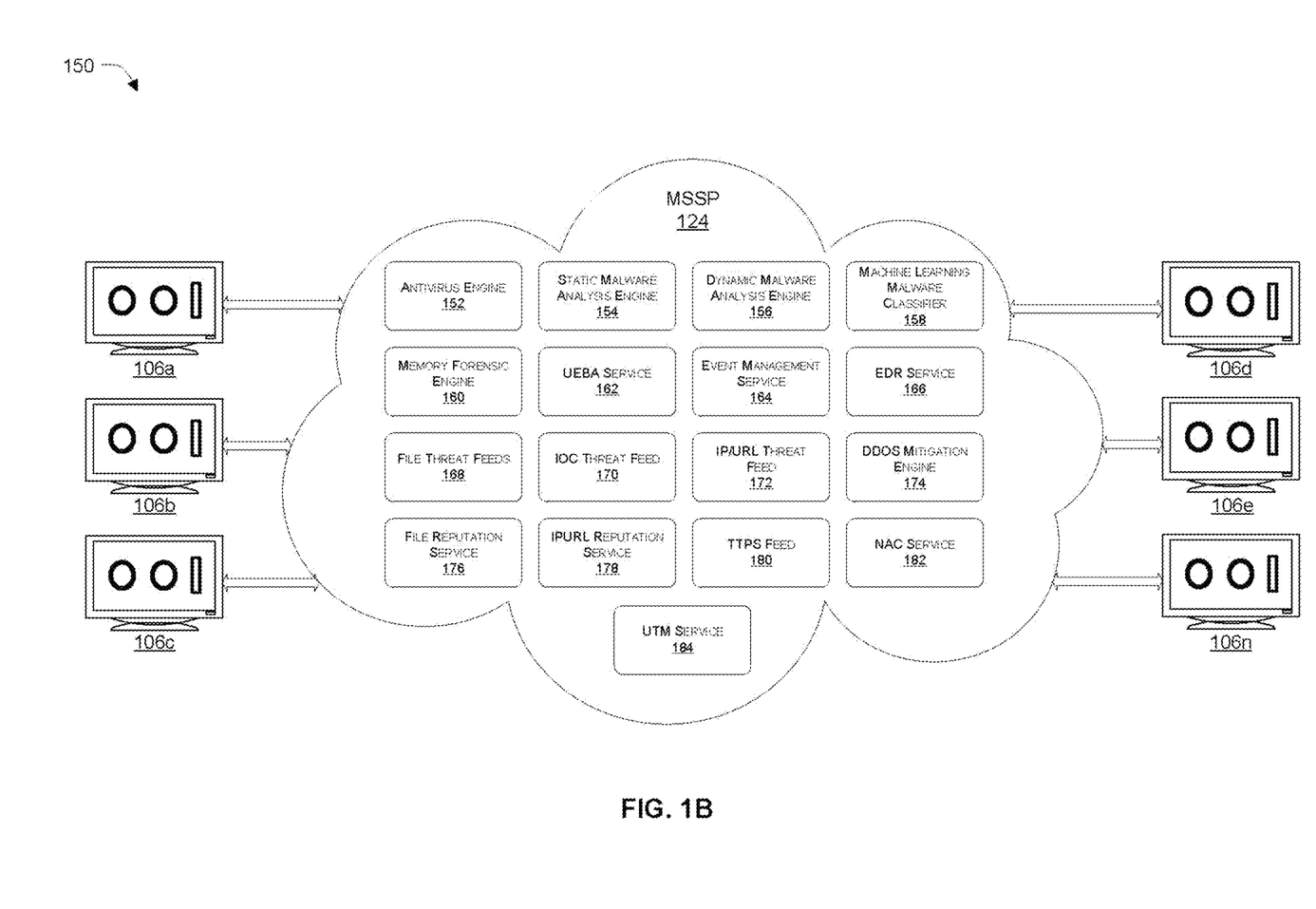

FIG. 1B illustrates a cloud-based network architecture 150 in which various aspects may be implemented in accordance with an embodiment of the present disclosure. In the context of the present example, a cloud-based security service/platform (e.g., MSSP 124) implements multiple data feeds 152-180 that may be capable of independently detecting a compromised device (e.g., an IoT device, an end-user device, etc.), for example, by detecting malicious activity and collecting relevant evidence, and identifying the compromised device. The cloud-based security service can be used for collecting device-specific data related to an incident detected by the agent (e.g., EDR agent 120) running on the endpoint device and network-specific data from one or more agents running on the endpoint device and other devices on the network, and detect one or more compromised devices by correlating device-specific data and network data.

The cloud-based security service can be used for augmenting or reclassifying an initial classification of an incident made by an endpoint protection platform (e.g., an endpoint protection platform 112) protecting the endpoint device on which the process associated with the detected incident is running.

Non-limiting examples of data feeds that may be used depending upon the particular implementation include various types of endpoint protection platforms (e.g., running on endpoint devices 106), an antivirus engine 152, a static malware analysis engine 154, a dynamic malware analysis engine 156 (e.g., a sandbox), machine-learning malware classifiers 158, a memory forensic engine 160, User and Entity Behavior Analytics (UEBA) service 162, an Event Management (EM) service 164, endpoint detection and response (EDR) service 166, file threat-feeds 168, an IoC threat feeds 170, an IP/URL threat feed 172, a distributed denial of service (DDoS) mitigation engine 174, a file reputation service 176, an IP/URL reputation service 178, a TTP feed 180, a NAC service 182, third party network services and the like. A cloud-based security platform may include a UEBA service 162, an event management service 164, an EDR service 166, a NAC service 182, and a UTM service 184.

UEBA agents (e.g., UEBA agent 116) running on endpoint devices 106, for example, as part of an endpoint protection platform (e.g., an endpoint protection platform 112) may make use of UEBA service 162 in connection with protecting the enterprise network (e.g., enterprise network 104) and the endpoint device 106 from insider threats by continuously monitoring users and endpoints with automated detection and response capabilities. According to one embodiment, the UEBA agent may make use of machine learning and advanced data analytics to automatically identify non-compliant, suspicious, or anomalous end-user behavior and may alert appropriate personnel (e.g., a network administrator or the user of the endpoint device at issue) regarding the potential of a compromised user account. This proactive approach to threat detection may deliver an additional layer of protection and visibility, whether the users are on or off the corporate network.

EM agents (e.g., EM agent 118) running on endpoint devices 106, for example, as part of an endpoint protection platform (e.g., an endpoint protection platform 112) may make use of event management service 164 to manage more complex endpoints, IoT, infrastructure, security tools, applications, VMs and the like, which may be constantly secured and monitored. The event management service 164, such as a STEM service, may facilitate the management of devices by providing visibility, correlation, automated response, and remediation in a single, scalable solution. By using a business services view, the complexity of managing network and security operations may be reduced, by freeing resources and improving breach detection.

EDR agents (e.g., EDR agent 120) running on an endpoint device 106, for example, as part of an endpoint protection platform (e.g., an endpoint protection platform 112) may make use of EDR service 166 to deliver advanced, real-time threat protection for endpoints both for pre-infection and post-infection scenarios. EDR agents may proactively reduce an attack surface, prevent malware infections, detect and defuse potential threats in real-time, and may automate response and remediation procedures with customizable playbooks. EDR technology may help enterprises to stop breaches in real-time automatically and efficiently, without overwhelming security teams with a slew of false alarms or disrupting business operations.

NAC agents (e.g., NAC agent 122) running on an endpoint device 1026, for example, as part of an endpoint protection platform (e.g., an endpoint protection platform 112) may make use of NAC service 182 to improve the visibility of network devices attached to the network and monitor network activities by attached devices. The NAC agent 122 and the NAC service in collaboration may provide the network visibility to see everything connected to the network, as well as the ability to control those devices and users, including dynamic, automated responses.

Figure 2:
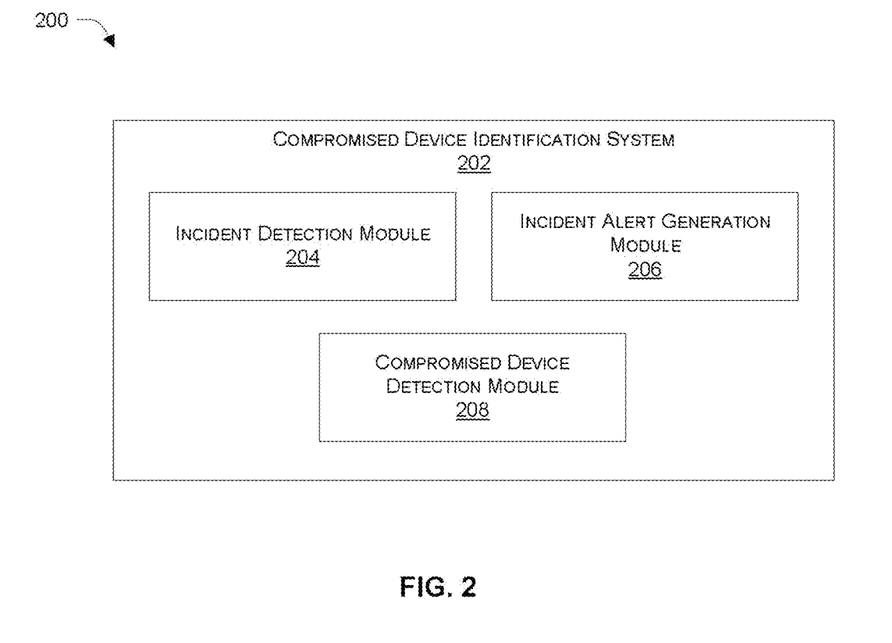
FIG. 2 is a block diagram illustrating functional modules of a compromised device detection system in accordance with an embodiment of the present disclosure.

FIG. 2 is a block diagram illustrating functional modules of a compromised device identification system 202 in accordance with an embodiment of the present disclosure. A compromised device identification system 202 includes an incident detection module 204 operable to cause an endpoint security agent (e.g., an endpoint detection and response (EDR) agent) of a plurality of endpoint security agents running on the endpoint device to detect an incident, an incident alert generation module 206 operable to cause the endpoint security agent to generate a security incident alert by proactively collecting data regarding the incident, and a compromised device detection module 208 operable to facilitate identification of a device coupled to a private network with which the endpoint device is associated as potentially being compromised. Module 208 is operable to identify the compromised device using a security service of a Managed Security Service Provider (MSSP) protecting the private network. In an embodiment, a security agent (e.g., NAC agent or UTM agent, or SIEM agent, or UEBA agent, etc.) of the plurality of security agents may transmit the security incident alert to the security service. In an embodiment, any security agent (e.g., EDR agent, UEBA agent, STEM agent, NAC agent) of the plurality of security agents running of the endpoint device can detect an incident and requests other co-located agents to start actively collecting activity details related to the incident, generate the security incident alert, which is context-aware. One of the agents of the plurality of agents can be configured to send a context-aware security incident alert to the security service. In an embodiment, the EDR agent transmits the security incident alert to the security service via a security agent of the plurality of endpoint security agents corresponding to the security service. The security service includes a network access control (NAC) service, and the security agent includes a NAC agent. In some embodiments, the security service includes a unified threat management (UTM) service, and the security agent includes a UTM agent. The incident detected by the EDR agent may relate to an observation by the EDR agent of a communication attempt between a process running on the endpoint device and a command and control (C&C) server. The communication attempt may include a connection attempt originated by the process and directed to the C&C server or the communication attempt may include a connection attempted originated by the C&C server and directed to the process.

As another example, an IoT device may be identified as compromised by correlating one or more unique properties of the network traffic even when a different C&C address is used by the attacker. For example, the communication channel through which the compromised IoT device communicates with the C&C server may use uncommon port numbers, use abnormal Internet Control Message Protocol (ICMP) traffic and/or have unique Uniform Resource Locator (URL) structures as part of the C&C channel.

Although various embodiments are described with reference to an EDR agent detecting the incident, those skilled in the art will appreciate that the system may respond to any incident detected by any of the plurality of endpoint security agents.

The incident alert generation module 206, on detection of an incident, may communicate with other agents running on the endpoint device to aggressively start collecting data related to the incident. In aggressive data collection mode, the agents may collect more data in comparison to normal mode. In aggressive mode, the agents may collect data related to the incident. The alert generation module 206 may generate an alert with enhanced data, that may add context to the alert. The module 206 may send the incident alert along with the enhanced data and context, which facilitates the detection of a potential compromised device by the security services more efficient. The system proactively collects data regarding the incident from other security agents of the plurality of endpoint security agents running of the endpoint device.

As those skilled in the art will appreciate, an EDR agent working in collaboration with an EDR service is effective in the detection of security breaches on endpoint devices in an organization; however, an EDR system (used to refer to EDR agent and EDR server independently or in combination) lacks visibility into communication taken by devices (e.g., IoT devices). EDR system may have good visibility into the changes at the endpoint devices, but may not have much context regarding network traffic and communication activities. By combining data from EDR incidents and NAC network data, it is possible to infer that a device (e.g., an IoT device) is compromised. The system 202 works synergistically with other agents and security services to detect and/or identity a compromised device. As those skilled in the art will appreciate, the system 202 not only detects the incident on the endpoint device on which the incident was first reported but may also identify other compromised devices in the network with which the endpoint device may have interacted. Such identification may be faster and/or more efficient as a result of the agents working in collaboration to collect relevant data related to the incident, and instead of merely reporting the incident to the security service, the security agent may share the security incident alert with the context data. An agent, for example, a NAC agent, starts collecting more data relevant to the detected incident (e.g., involving a specific IP address), which it may not have collected otherwise in accordance with normal scheduled operation.

Intercommunication of the agents running on the endpoint device facilitate more comprehensive data collection and generation of context-aware alerts. The alert with context and enhanced data, when shared with the security service, allows the security service to perform detection of a compromised device efficiently and may enable the security service to take corrective action early.

In an embodiment, if malware activity (incident) is detected at an endpoint device (e.g., a malware connection to a malicious C&C detected by an EDR agent), and an IoT device has in the past attempted or established a connection to or from C&C server or attempts or establishes such a connection in the future (as detected by a NAC agent or a UTM agent), the synergistic cooperation between the agent (e.g., the EDR agent) collecting device-specific incident data and the agent (e.g., the NAC agent or the UTM agent) collecting the network connection data may allow a security service (e.g., the NAC service or the UTM service) to infer the IoT device is part of the breach and is compromised. The service may actively collect relevant data from a potentially compromised device through agents running on the endpoint device to conclude the IoT device is actually compromised.

Figure 3:
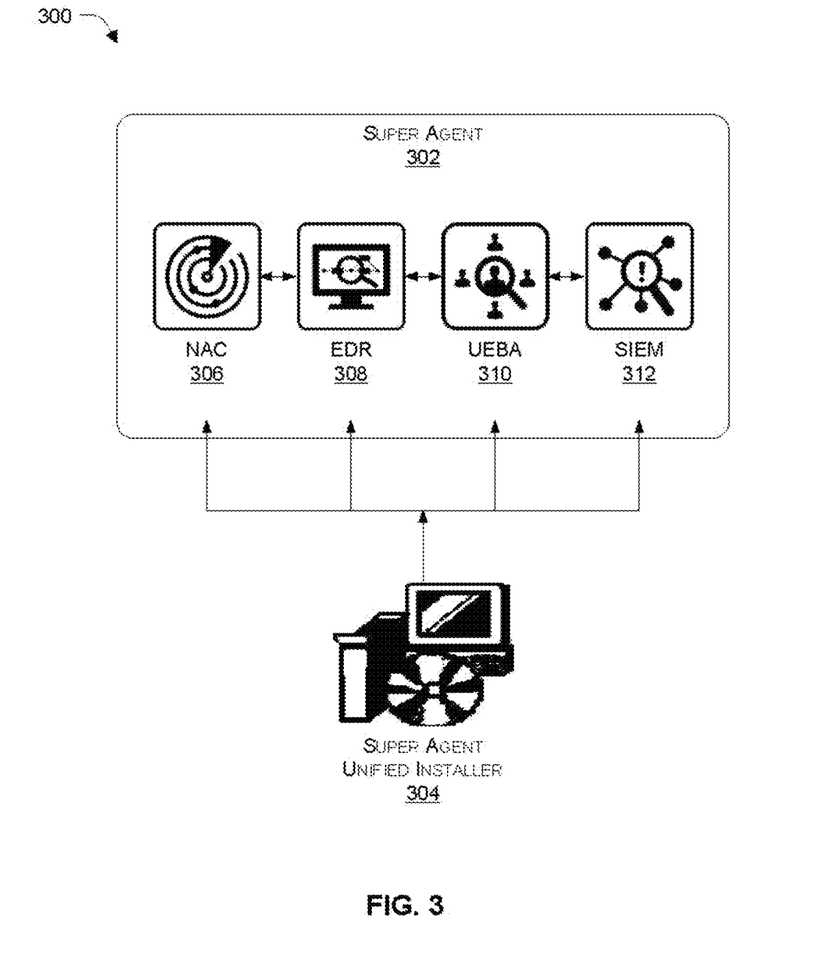
FIG. 3 is a block diagram illustrating multiple endpoint security agents in accordance with an embodiment of the present disclosure.

FIG. 3 is a block diagram 300 illustrating multiple endpoint security agents in accordance with an embodiment of the present disclosure. A super agent 302 including multiple cooperating agents, for example, NAC 306, EDR 308, UEBA 310, and SIEM 312, may be installed on an endpoint device using a super agent unified installer 304. The installer 304 may allow a user to select one or a combination of security agents to be installed on the endpoint device. The security agents running on the endpoint device may be aware of the presence of other security agents running on the endpoint device and their respective capabilities. The security agents may communicate with each other to aggressively collect more data related to a suspected incident or a detected incident.

Figure 4:
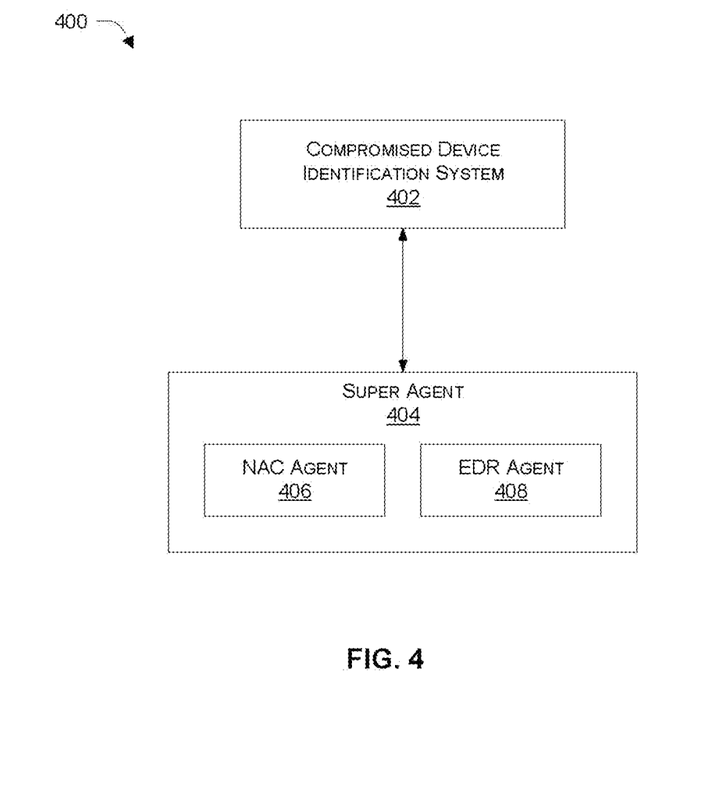
FIG. 4 is a block diagram illustrating a super-agent reporting device-specific data and network data in accordance in accordance with an embodiment of the present disclosure.

FIG. 4 is a block diagram 400 illustrating a super-agent 404 reporting device-specific data and network data in accordance in accordance with an embodiment of the present disclosure. As shown in FIG. 4, the super agent 404 running on an endpoint device (e.g., endpoint device 106) may include a NAC agent 406 operable to collect and send data related to network activities of the endpoint device to a compromised device identification system 402 (which may also be referred to as compromised device detection system), and an EDR agent 408 operable to collect and send endpoint device-specific incident data to the compromised device detection system 402. In an embodiment, system 402 may work in collection with security services to identify one or more compromised devices that may be connected directly or indirectly with the endpoint device. The incident detected may involve a security breach in which protected files from the endpoint device were moved. In the context of the present example, the comprised device may be one through which the files where moved or from which the intruder gained access to the endpoint device.

In an embodiment, the EDR agent 408 may collect device-specific data, which may include activity details of different changes performed at the hardware level, middleware, and/or application level. Non-limiting examples of the activities include file access, device configuration changes, installation of a new application or service, and access to the registry. The NAC agent 406 may collect and send the network data, which may include access of file from the endpoint device, access of file by the endpoint device, a connection request to one or more network resources, access request to one or more resources, and other such network activities.

Figure 5:
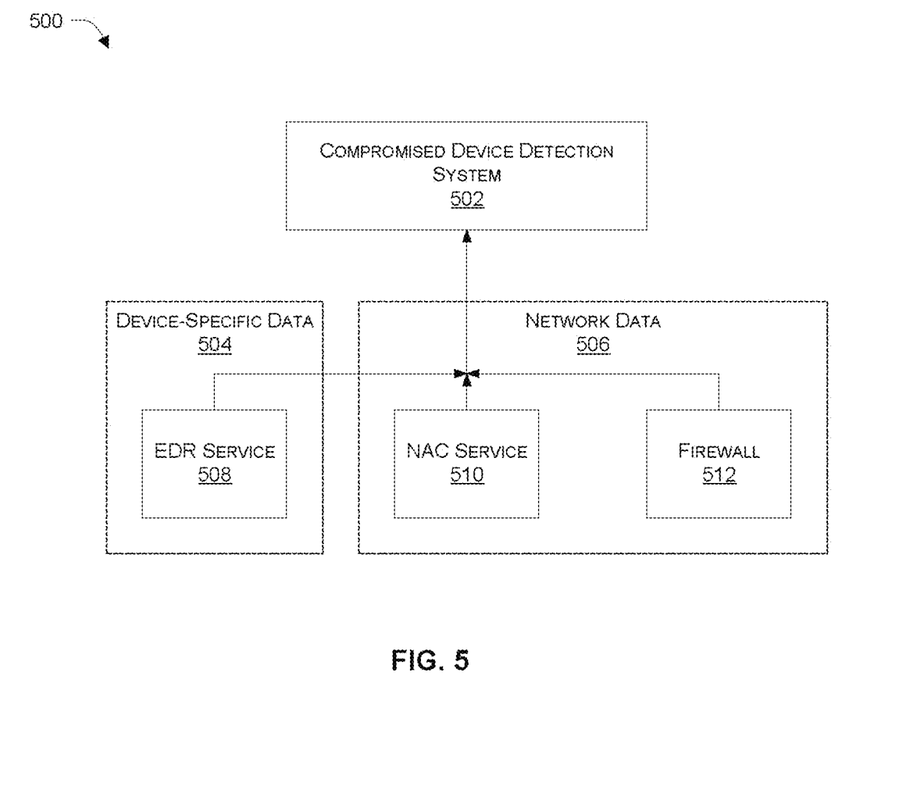
FIG. 5 is a block diagram illustrating device-specific data reported by an EDR service and network data reported by network security service in accordance with an embodiment of the present disclosure.

FIG. 5 is a block diagram 500 illustrating device-specific data being reported by an EDR service and network data being reported by network security service in accordance with an embodiment of the present disclosure. As shown in FIG. 5, device-specific data 504 may be collected by an EDR service 508 from EDR agent installed on the endpoint device, and network data 506 may be collected by NAC service 510 or by a firewall 512 or by a UTM service from endpoint devices. The device-specific data 504 and network-specific data 506 may be shared with the compromised device detection system 502. System 502 may correlate the device-specific data and the network data to identify a compromised device.

Figure 6:
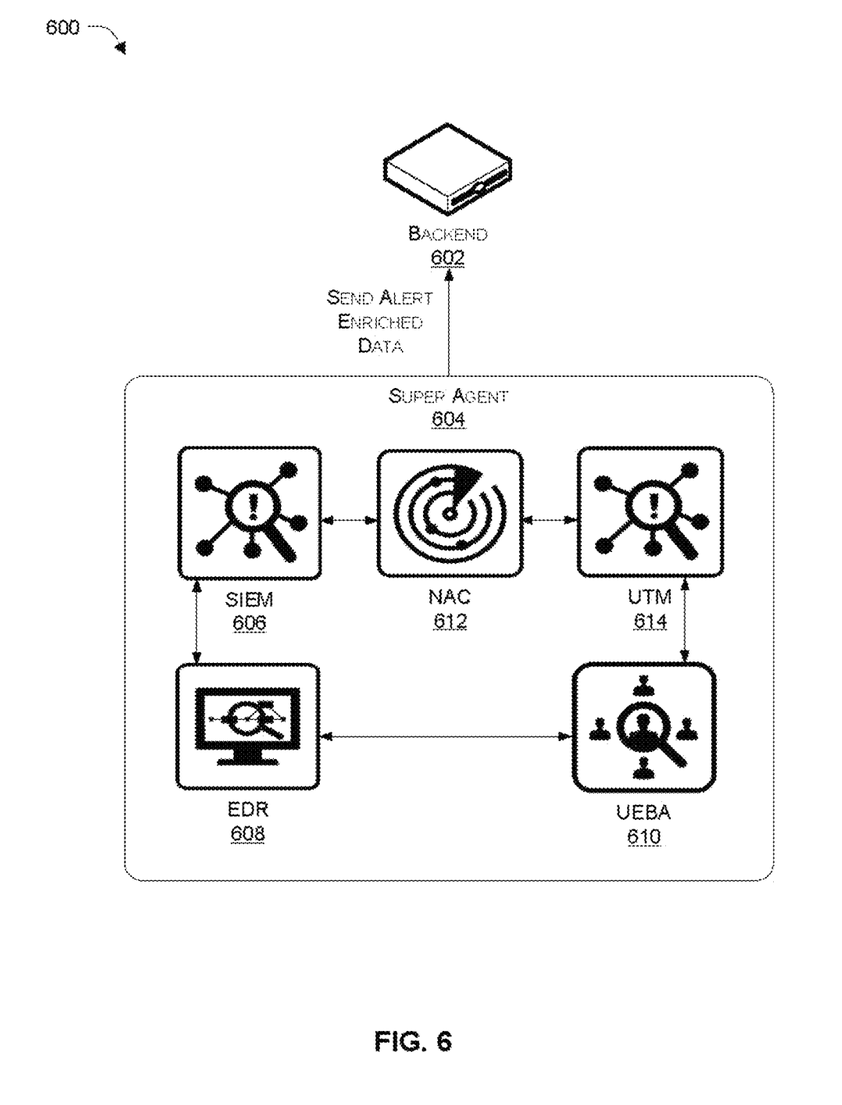
FIG. 6 is another use-case diagram illustrating interactions between SIEM, EDR, NAC agent, UTM agent, and UEBA agents that are configured as part of a super-agent in accordance with an embodiment of the present disclosure.

FIG. 6 is another use-case diagram illustrating interactions between SIEM, EDR, NAC agent, UTM agent, and UEBA agents that are configured as part of a super-agent in accordance with an embodiment of the present disclosure. FIG. 6 is a use-case diagram 600 illustrating interactions between a STEM agent 606, an EDR agent 608, a UEBA agent 610, a NAC agent 612, and a UTM agent 614 of a super agent 604 (e.g., super agent 114) in accordance with an embodiment of the present disclosure. In a typical siloed deployment scenario, in which a STEM service (e.g., event management device 110 or event management service 128) is not in communication with other security services (e.g., an EDR service (e.g., EDR service 130) and/or a UEBA service (e.g., UEBA device 108 or UEBA service 126)), the STEM service may receive alerts and/or generate alerts based on data collected from various different security controls. However, in the context of various examples described herein, when communication is facilitated between the STEM service and other security services, for example, via the STEM agent 606, the EDR agent 608, the UEBA agent 610, the NAC agent 612, the UTM agent 614, the SIEM service is able to provide additional supporting context relating to STEM alerts by leveraging data collected by the EDR service, and/or UTM server, and/or the NAC server and/or the UEBA service. In an embodiment, the EDR 606 on detection of an incident may alert UEBA 610, SIEM 606, NAC 612, and UTM 614 to start aggressively collecting more data related to the incident detected by EDR 606.

In the context of the present example, alerts received by and/or generated by a STEM service (e.g., event management device 110 or event management service 128) based on data collected from various different security controls may be enhanced or enriched using data or network security information received via SIEM agent 606 from an EDR service (e.g., EDR service 130) via the EDR agent 608 and/or a UEBA service (e.g., UEBA device 108 or UEBA service 128) via the UEBA agent 610, NAC service (e.g., NAC service 132) via the NAC agent and/or UTM service via UTM agent.

In the context of the present example, assuming an incident (e.g., a modification to a sensitive file using a file integrity monitoring (FIN) mechanism) has been detected by the EDR service, the EDR service may leverage the UTM service (via their respective agents) or the NAC service (via the NAC agent) to obtain information regarding network interactions between the endpoint device where the incident is detected and other connected devices related to the sensitive file. In one embodiment, upon determination of the network interaction, other compromised devices (e.g., a user device or IoT device) may also be determined. Additionally, suspicious activities associated with the network interaction (e.g., from EDR data 208) may be determined and added to produce an enriched incident alert.

In various embodiments described herein, the super agent may produce the enriched incident alert using one or more of EDR data, UTM data and/or NAC data received from the EDR service (via EDR agent 608), UTM service (via the UTM agent 614), and/or NAC service (via NAC agent 612). The super agent 604 may send an alert with enhanced data to backend 602 service (e.g., the compromised device detection system 402) to efficiently detect compromised devices.

Figure 7:
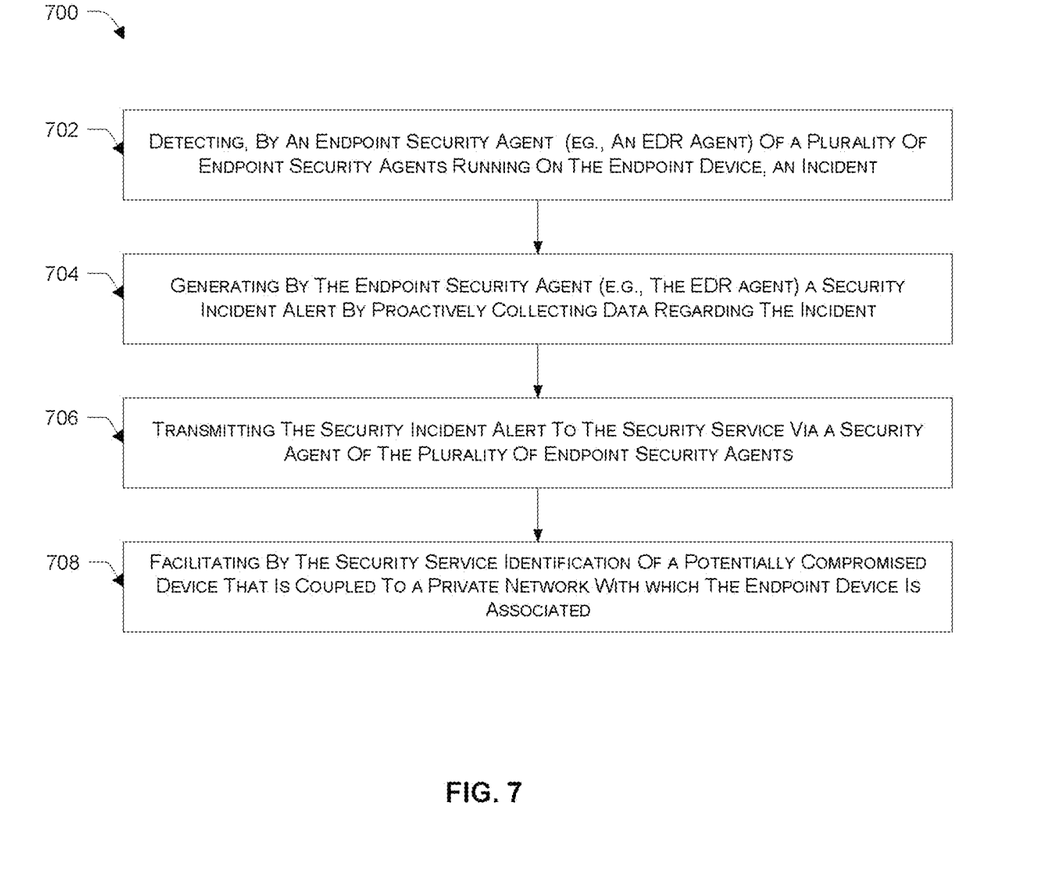
FIG. 7 is a flow diagram illustrating a process of detecting a compromised device in accordance with an embodiment of the present disclosure.

FIG. 7 is a flow diagram 700 illustrating a process of detecting a compromised device in accordance with an embodiment of the present disclosure. The process 700 may be executed by processing resources of one or more devices or cloud infrastructure that may be located in different network environments. The process 700 includes the steps of detecting, by an endpoint security agent (eg., an EDR agent) of a plurality of endpoint security agents running on the endpoint device, an incident as shown at block 702, generating by the endpoint security agent a security incident alert by proactively collecting data regarding the incident as shown at block 704, transmitting the security incident alert to the security service via a security agent of the plurality of endpoint security agents as shown at block 706 and facilitating by the security service identification of a potentially compromised device (e.g., an IoT device) that is coupled to a private network with which the endpoint device is associated as shown at block 708.

In an embodiment, the potentially compromised device is identified by a security service of a Managed Security Service Provider (MSSP) protecting the private network. As noted above, a compromised endpoint device may be identified based on an incident detected by an EDR agent running on the endpoint device in which the incident relates to a communication attempt between a process running on the endpoint device and a C&C server. Similarly, an IoT device may be identified as compromised by correlating one or more unique properties of the network traffic even when a different C&C address is used by the attacker. For example, the communication channel through which the compromised IoT device communicates with the C&C server may use uncommon port numbers, use abnormal Internet Control Message Protocol (ICMP) traffic and/or have unique Uniform Resource Locator (URL) structures as part of the C&C channel.

At block 710, an automated response may be generated for the compromised endpoint.

The security service may receive device-specific data from respective endpoint security agent installed on an endpoint device and receives network data from a network security agent (e.g., NAC agent or UTM agent). The security service correlates the device-specific data and the network data to determine the detailed identity of the endpoint device and connected devices. The service further analyzes the device-specific data and the network data to detect if the endpoint device is compromised. The endpoint security agent includes any or combination of endpoint protection and response (EDR), antivirus (AV) agent, UEBA agent, and STEM agent. The network security agent includes any or combination of Network Access Control (NAC) agent, UTM agent, and a firewall agent.

In an embodiment, the device-specific data include activity details relating to various changes performed at the hardware level, middleware, and/or application level. The activities may include file access, device configuration change, installation of a new application or service, and/or access to a registry (e.g., a database that stores low-level settings for an operating system of the endpoint device and/or for applications running on the endpoint device). The network data may include information regarding access to a file from the endpoint device, access of a file by the endpoint device, a connection request to one or more network resources, an access request to one or more resources, and other such network activities.

In the context of the above description, the endpoint security agents may monitor security incidents on an endpoint device and detect and malicious activity, and the network security agents and services may monitor the network activity relating to different devices attached to the network and identity suspicious activities.

Figure 8:
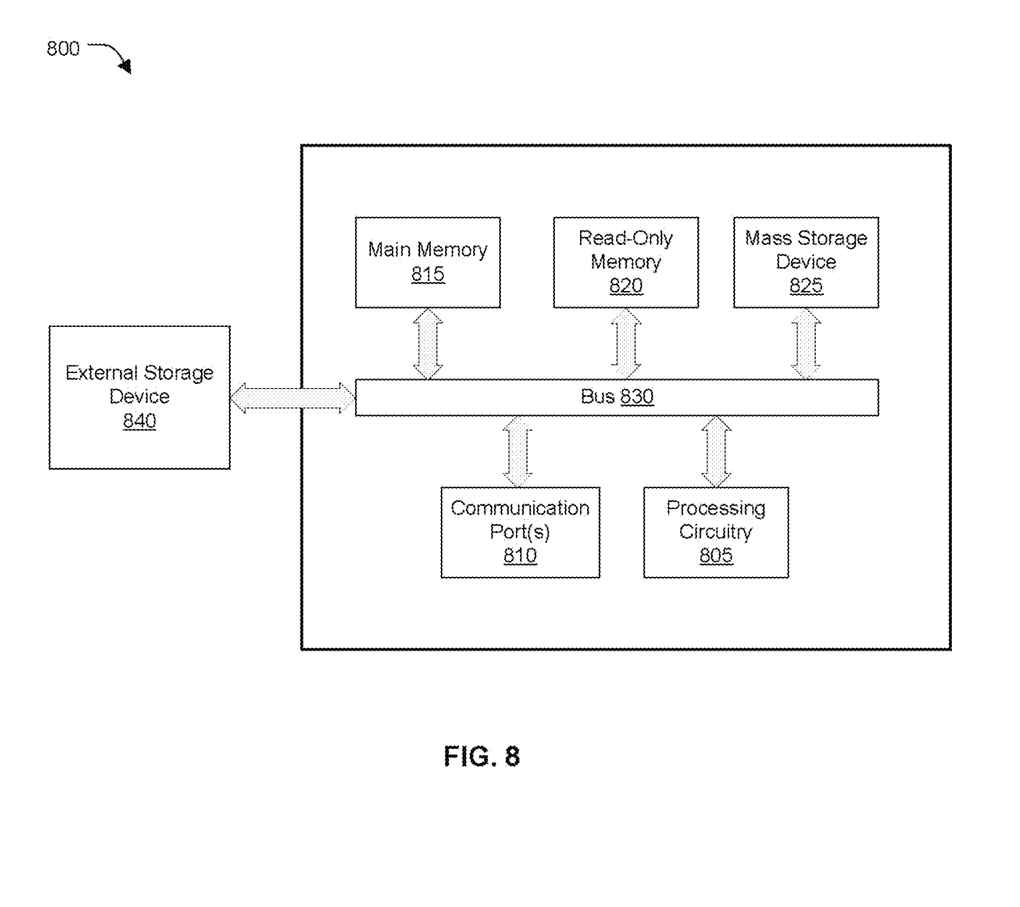
FIG. 8 illustrates an exemplary computer system in which or with which embodiments of the present disclosure may be utilized.

FIG. 8 illustrates an exemplary computer system 800 in which or with which embodiments of the present disclosure may be utilized. As shown in FIG. 8, the computer system includes an external storage device 840, a bus 830, a main memory 820, a read-only memory 820, a mass storage device 825, one or more communication ports 810, and one or more processing resources (e.g., processing circuitry 805). In one embodiment, computer system 800 may represent some portion of an endpoint device (e.g., endpoint device 106 of FIGS. 1A-B) or a computing system in virtual or physical form supporting one of the security services described herein.

Those skilled in the art will appreciate that computer system 800 may include more than one processing resource and communication port 810. Non-limiting examples of processing circuitry 805 include, but are not limited to, an Intel® Itanium® or Itanium 2 processor(s), or AMD® Opteron® or Athlon MP® processor(s), Motorola® lines of processors, FortiSOC™ system on chip processors or other future processors. Processing circuitry 805 may include various modules associated with embodiments of the present disclosure.

Communication port 810 can be any of an RS-232 port for use with a modem-based dialup connection, a 10/100 Ethernet port, a Gigabit or 10 Gigabit port using copper or fiber, a serial port, a parallel port, or other existing or future ports. Communication port 810 may be chosen depending on a network, such as a Local Area Network (LAN), Wide Area Network (WAN), or any network to which the computer system connects.

Memory 815 can be Random Access Memory (RAM), or any other dynamic storage device commonly known in the art. Read only memory 820 can be any static storage device(s) e.g., but not limited to, a Programmable Read Only Memory (PROM) chips for storing static information e.g. start-up or BIOS instructions for the processing resource.

Mass storage 825 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 830 communicatively couples processing resource(s) with the other memory, storage and communication blocks. Bus 830 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 830 to support direct operator interaction with computer system. Other operator and administrative interfaces can be provided through network connections connected through communication port 860. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the disclosure, other and further embodiments may be devised without departing from the basic scope thereof.

What is claimed is:

1. An endpoint device comprising:
a processing resource; and
a non-transitory computer-readable medium, coupled to the processing resource, having stored therein instructions that when executed by the processing resource cause the processing resource to:
detect, by an endpoint detection and response (EDR) agent of a plurality of endpoint security agents running on the endpoint device, an incident;
generate, by the EDR agent, a security incident alert by proactively collecting data regarding the incident; and
facilitate, by the EDR agent, identification of a device coupled to a private network as potentially being compromised by a security service of a Managed Security Service Provider (MSSP) protecting the private network by transmitting the security incident alert to the security service via a security agent of the plurality of endpoint security agents corresponding to the security service.

2. The endpoint device of claim 1, wherein the security service comprises a network access control (NAC) service and wherein the security agent comprises a NAC agent.

3. The endpoint device of claim 1, wherein the security service comprises a unified threat management (UTM) service and wherein the security agent comprises a UTM agent.

4. The endpoint device of claim 1, wherein the incident relates to an observation by the EDR agent of a communication attempt between a process running on the endpoint device and a command and control (C&C) server.

5. The endpoint device of claim 4, wherein the communication attempt comprises a connection attempt originated by the process and directed to the C&C server.

6. The endpoint device of claim 4, wherein the communication attempt comprises a connection attempted originated by the C&C server and directed to the process.

7. The endpoint device of claim 4, wherein the device is identified as potentially being compromised by the security service as a result of a communication attempt observed by the security service between the device and the C&C server.

8. The endpoint device of claim 7, wherein the device comprises an Internet of Things (IoT) device.

9. A method performed by a processing resource of an endpoint device, the method comprising:
  detecting, by an endpoint detection and response (EDR) agent of a plurality of endpoint security agents running on the endpoint device, an incident;
  generating, by the EDR agent, a security incident alert by proactively collecting data regarding the incident; and
  facilitating, by the EDR agent, identification of a device coupled to a private network as potentially being compromised by a security service of a Managed Security Service Provider (MSSP) protecting the private network by transmitting the security incident alert to the security service via a security agent of the plurality of endpoint security agents corresponding to the security service.

10. The method of claim 9, wherein the security service comprises a network accesss control (NAC) service and wherein the security agent comprises a NAC agent.

11. The method of claim 9, wherein the security service comprises a unified threat management (UTM) service and wherein the security agent comprises a UTM agent.

12. The method of claim 9, wherein the incident relates to an observation by the EDR agent of a communication attempt between a process running on the endpoint device and a command and control (C&C) server.

13. The method of claim 12, wherein the communication attempt comprises a connection attempt originated by the process and directed to the C&C server.

14. The method of claim 12, wherein the communication attempt comprises a connection attempted originated by the C&C server and directed to the process.

15. The method of claim 12, wherein the device is identified as potentially being compromised by the security service as a result of a communication attempt observed by the security service between the device and the C&C server.

16. The method of claim 12, wherein the device comprises an Internet of Things (IoT) device.

17. A non-transitory computer-readable storage medium embodying a set of instructions, which when executed by a processing resource of an endpoint computing device, causes the processing resource to:
  detect, by an endpoint detection and response (EDR) agent of a plurality of endpoint security agents running on the endpoint device, an incident;
  generate, by the EDR agent, a security incident alert by proactively collecting data regarding the incident; and
  facilitate, by the EDR agent, identification of a device coupled to a private network as potentially being compromised by a security service of a Managed Security Service Provider (MSSP) protecting the private network by transmitting the security incident alert to the security service via a security agent of the plurality of endpoint security agents corresponding to the security service.

18. The non-transitory computer-readable storage medium of claim 17, wherein the security service comprises a network accesss control (NAC) service and wherein the security agent comprises a NAC agent.

19. The non-transitory computer-readable storage medium of claim 17, wherein the security service comprises a unified threat management (UTM) service and wherein the security agent comprises a UTM agent.

20. The non-transitory computer-readable storage medium of claim 17, wherein the incident relates to an observation by the EDR agent of a communication attempt between a process running on the endpoint device and a command and control (C&C) server.

21. The non-transitory computer-readable storage medium of claim 20, wherein the communication attempt comprises a connection attempt originated by the process and directed to the C&C server.

22. The non-transitory computer-readable storage medium of claim 20, wherein the communication attempt comprises a connection attempted originated by the C&C server and directed to the process.

23. The non-transitory computer-readable storage medium of claim 20, wherein the device is identified as potentially being compromised by the security service as a result of a communication attempt observed by the security service between the device and the C&C server.

24. The non-transitory computer-readable storage medium of claim 20, wherein the device comprises an Internet of Things (IoT) device.

* * * * *